(12) United States Patent
Byer et al.

(10) Patent No.: US 9,224,072 B2
(45) Date of Patent: Dec. 29, 2015

(54) SYSTEM AND METHOD FOR GENERATING A USER INTERFACE FROM A PRINTER DESCRIPTION

(75) Inventors: Scott Byer, Cupertino, CA (US); Abhijit Kalamkar, Sunnyvale, CA (US); Yevgeniy Alexandrovich Gutnik, Cupertino, CA (US); Sanjeev Radhakrishnan, San Jose, CA (US)

(73) Assignee: Google Inc., Mountain View, CA (US)

( * ) Notice: Subject to any disclaimer, the term of this patent is extended or adjusted under 35 U.S.C. 154(b) by 205 days.

(21) Appl. No.: 13/369,259

(22) Filed: Feb. 8, 2012

(65) Prior Publication Data

US 2015/0206036 A1 Jul. 23, 2015

Related U.S. Application Data

(60) Provisional application No. 61/564,769, filed on Nov. 29, 2011.

(51) Int. Cl.
  *G06F 3/12* (2006.01)
  *G06K 15/00* (2006.01)
  *G06F 3/01* (2006.01)

(52) U.S. Cl.
  CPC .............. *G06K 15/007* (2013.01); *G06F 3/01* (2013.01); *G06F 3/1204* (2013.01); *G06F 3/1205* (2013.01); *G06F 3/1225* (2013.01); *G06F 3/1285* (2013.01)

(58) Field of Classification Search
  None
  See application file for complete search history.

(56) References Cited

U.S. PATENT DOCUMENTS

| | | | |
|---|---|---|---|
| 7,054,015 B1 | 5/2006 | Ganji | |
| 7,148,989 B2 | 12/2006 | Hitaka | |
| 7,861,182 B2 | 12/2010 | Liu | |
| 2005/0105129 A1* | 5/2005 | Takahashi | 358/1.15 |
| 2007/0139662 A1* | 6/2007 | Eom et al. | 358/1.1 |
| 2007/0195352 A1* | 8/2007 | Liu | 358/1.13 |
| 2008/0244434 A1* | 10/2008 | Takei | 715/771 |
| 2008/0244567 A1* | 10/2008 | Zhan | 717/178 |
| 2010/0225957 A1 | 9/2010 | Liu | |
| 2011/0194124 A1 | 8/2011 | Sweet et al. | |
| 2011/0194140 A1 | 8/2011 | Sweet et al. | |
| 2011/0222107 A1* | 9/2011 | Williams | 358/1.15 |
| 2011/0235085 A1 | 9/2011 | Jazayeri et al. | |

* cited by examiner

*Primary Examiner* — John Wallace
(74) *Attorney, Agent, or Firm* — McDermott Will & Emery LLP

(57) ABSTRACT

Systems, methods, and machine-readable media for generating a user interface from a printer description file are discussed. The system comprising an interface module, an option module, and an interface generation module. The interface module may be configured to receive a printer description file comprising a plurality of printer options for a remote printer and the option module may be configured to select a subset of the plurality of printer options for the remote printer based on a list of prioritized printer options. The interface generation module may be configured to generate rendering code based on the subset of the plurality of printer options for the remote printer, the rendering code to enable a computing device to generate a user interface for the remote printer. The rendering code may be transmitted to a computing device in response to receiving, from the computing device, a print request for the remote printer.

21 Claims, 5 Drawing Sheets

300

SYSTEM AND METHOD FOR GENERATING A USER INTERFACE FROM A PRINTER DESCRIPTION

RELATED APPLICATION

This application claims priority to U.S. Provisional Patent Application No. 61/564,769, filed on Nov. 29, 2011, entitled "SYSTEM AND METHOD FOR GENERATING A USER INTERFACE FROM A PRINTER DESCRIPTION FILE," the entire contents of which are herein incorporated by reference in its entirety.

BACKGROUND

The present disclosure generally relates to printing technologies and, in particular, to generating a user interface for printing.

Printers are made by various manufacturers with varying characteristics and capabilities. For example, some printers print only in black and white while others may also print in color. Some printers may be able to print in higher resolution than others or handle more sizes of paper or different types of paper (e.g., photo paper, cardstock, envelopes, etc.) than other printers. Some printers may be able to print on both sides, collate, or staple.

Installing a printer typically involves connecting a computer to a printer, downloading an appropriate printer driver to the computer, and installing the printer driver on to the computer. The installation of the printer driver is generally specific to the printer (e.g., the printer type, printer characteristics, and printer manufacturer) and the operating system of the computer.

Once installed, applications running on the operating system of the computer may be able to communicate with the printer and send print jobs to the printer. For example, a user may initiate a print command from an application running on the computer. Once a print command is initiated, a user interface (e.g., a print dialog) may be presented to the user to allow the user to select print options and submit the final printing instructions to the printer. This user interface is typically provided by the printer manufacturer and may be specific to the printer and the operating system of the computer.

SUMMARY

According to one aspect of the subject technology, a system for generating a user interface from a printer description file is provided. The system comprising an interface module, an option module, and an interface generation module. The interface module may be configured to receive a printer description file comprising a plurality of printer options for a remote printer and the option module may be configured to select a subset of the plurality of printer options for the remote printer based on a list of prioritized printer options. The interface generation module may be configured to generate rendering code based on the subset of the plurality of printer options for the remote printer, the rendering code to enable a computing device to generate a user interface for the remote printer.

According to another aspect of the subject technology, a computer-implemented method for generating a user interface from a printer description file is provided. The method may include obtaining a printer description file comprising a plurality of printer options for a remote printer and selecting a subset of the plurality of printer options for the remote printer based on a list of prioritized printer options. The method may further include receiving, from a computing device, a print request for the remote printer, generating rendering code based on the subset of the plurality of printer options for the remote printer, the rendering code to enable the computing device to generate a user interface for the remote printer, and transmitting the rendering code to the computing device.

According to yet another aspect of the subject technology, a machine-readable medium including instructions stored therein, which when executed by a machine, cause the machine to perform operations for generating rendering code for a user interface is provided. The operations may include receiving, during a registration process for a remote printer, a printer description file comprising a plurality of printer options for the remote printer, selecting a subset of the plurality of printer options for the remote printer based on a list of prioritized printer options, and generating rendering code based on the subset of the plurality of printer options for the remote printer, the rendering code to enable a computing device to generate a user interface for the remote printer.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

Figure 1:
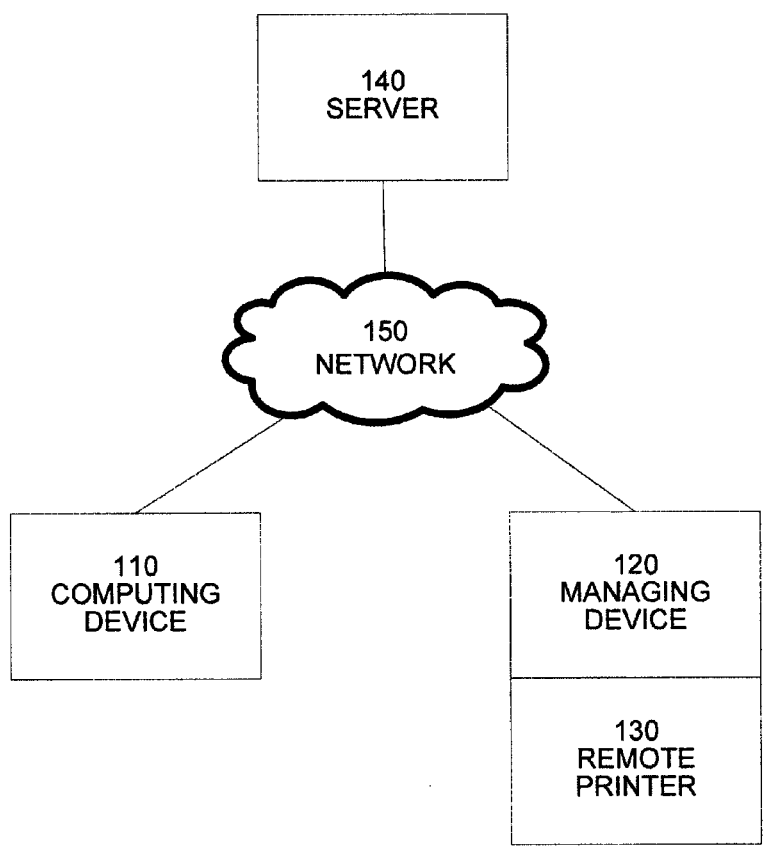
FIG. 1 is a conceptual diagram illustrating a network environment in which aspects of the subject technology may be implemented, in accordance with one aspect of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

According to various aspects of the subject technology, systems and methods may be used to generate a user interface from a printer description file. The systems may exist in a remote printing environment (e.g., for cloud printing services) and enable a device, which may have limited computing resources, to print to a remote printer without having to install the printer drivers. Instead, the device may be provided with rendering code that enables the device to display a user interface that can be used to send a print job from the device to the remote printer.

In one aspect, the user interface may be a standardized (e.g., printer-independent and operating system independent) user interface that may be used to specify which printer options are to be enabled for a print job. Furthermore, the subset of the total number of printer options and characteristics for a particular printer may be selected and displayed in the user interface in order to provide a better user experience. For example, certain devices may have limited display space (e.g., smart phones or tablet computers) and providing a simplified user interface with a limited number of printer options that are most frequently used or that are most important to users may aid a user of a device to locate and select desired printer options.

The printer description file used to generate the user interface may be any file that describes the features, options, capabilities, or characteristics of a printer. For example, the printer description file may be a postscript printer description (PPD) file, an XML paper specification (XPS) file, or other file that contains the features and capabilities of a printer.

Printer characteristics may include, for example, a printer name, a printer type, a printer model, a printer status, a location, a description, or any other information about the printer. Printer options may include, among other things, color or grey scale, portrait or landscape paper orientation, one sided or duplex printing, number of copies, paper size, collate copies, staple copies, scaling (e.g., shrinking or enlarging), resolution or dots-per-inch (DPI), watermarks, rotating orientation, and imaging effects (contrast enhancement, focusing, sharpness, smoothing, digital flash, etc.).

FIG. 1 is a conceptual diagram illustrating a network environment 100 in which aspects of the subject technology may be implemented, in accordance with one aspect of the subject technology. Although FIG. 1 illustrates a client-server network environment 100, other aspects of the subject technology may include other configurations including, for example, peer-to-peer environments or single system environments.

The network environment 100 may include one or more computing devices 110 and one or more remote printers 130 connected over a network 150. Each remote printer 130 may also be connected to a managing device 120 (e.g., a computer, an interface module, or other device) that may receive a print job via the network 150 and transmit the print job to the remote printer 130 such that the remote printer 130 can execute the print job. The managing device 120 may be built into the remote printer 130 or may be a separate device and may include logic (e.g., an installed printer driver for the remote printer 130) that may be used to convert a print job (e.g., data to be printed) to a form that may be understood by the remote printer 130 and used to print the print job.

The network 150 may include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The computing device 110 may be any system or device having a processor, a memory, and communications capability for transmitting a print request, receiving rendering code, using the rendering code to display a user interface that includes print options for the print job, and initiating a print job in the network environment 100. The computing device 110 may be, for example, a personal computer, a server, a mobile device (e.g., a smart phone, a global positioning system device, a camera, etc.), a laptop, or a tablet computer.

In one aspect, the network environment 100 may also include a server 140 configured to facilitate the remote printing between the computing device 110 and the remote printer 130. As will be discussed in further detail below, the server 140 may further include one or more modules that may be configured to, for example, obtain printer description files for various printers 130, generate rendering code for a user interface, and provide the rendering code to one or more computing devices 110. In one aspect of the subject technology, the server 140 may be a single computing machine. However, in other aspects, the server 140 may be a virtual entity that might refer to a cluster or even multiple clusters of servers.

Figure 2:
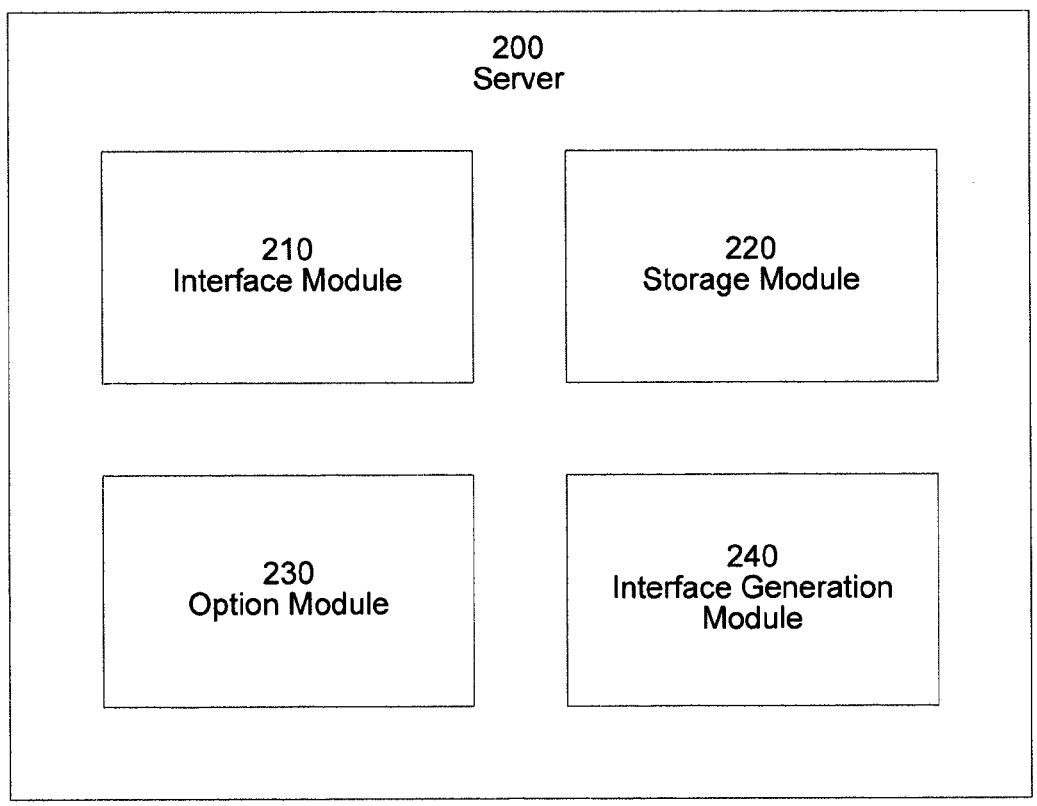
FIG. 2 is a conceptual diagram illustrating a system for generating rendering code for a user interface from a printer description file, in accordance with one aspect of the subject technology.

FIG. 2 is a conceptual diagram illustrating a system 200 for generating rendering code for a user interface from a printer description file, in accordance with one aspect of the subject technology. The system 200 may be implemented in, for example, the server 140 in the network environment 100 of FIG. 1 and may provide a remote printing service for computing devices 110 in the network environment 100. In other aspects, the system 200 may also be located on other machines (e.g., computing device 110) or various modules of system 200 may be located on more than one machine (e.g., computing device 110 and server 140).

The system 200 may include an interface module 210, a storage module 220, a option module 230, and an interface generation module 240. The modules illustrated in FIG. 2 may include software instructions encoded in a medium and executed by a processor, computer hardware components, or a combination of both. For example, the modules may each include one or more processors or memories that are used to perform the functions described below. According to another aspect, the various systems and modules may share one or more processors or memories.

The interface module 210 may be configured to obtain a printer description file for a remote printer and store the printer description file in the storage module 220. For example, a managing device connected to the remote printer (e.g., a computer attached to the printer or an interface module on the printer) may register the printer with the system 200. During registration, the managing device may transmit, to the remote printing service, a printer description file (e.g., a PPD file or an XPS file) containing the various characteristics of the printer needed to enable remote printing capabilities.

The option module 230 may be configured to identify a number of printer options and, in some cases, printer characteristics for a remote printer based on the information in the printer description file for the remote printer. One or more of these options or characteristics may be selected by the option module 230 to be included in a user interface to be displayed to a user. In some cases, the number of printer options and characteristics may be quite large and displaying all the printer options and characteristics to a user in a user interface may clutter the user interface and make it difficult for a user to locate particular options or information. Accordingly, the option module 230 may be configured to select a subset of the printer options and characteristics to display to the user.

In one aspect, the option module 230 may compare the printer options for a remote printer derived from the printer description file with a set of prioritized printer options representing a number of printer options that the system believes would be most useful for a user (e.g., color or grey scale, portrait or landscape paper orientation, one sided or duplex printing, number of copies, paper size, etc.). Printer options in both the printer options from the printer description file and the set of prioritized printer options may be selected to be included in the user interface.

In this way, only a subset of the most important printer options that are available for the remote printer may be included in the user interface. Other prioritized printer options that are not available for the remote printer may also not be included in the user interface. For example, if a remote printer may only print in black-and-white or grey scale, an option for color printing will not be shown in the user interface even if color printing is one of the options in the set of prioritized printer options. In another aspect, the option module 230 may also select a subset of the printer characteristics to be displayed in the user interface based on a set of prioritized printer characteristics (e.g., printer location and printer name).

Based on the selected printer options and characteristics, the interface generation module 240 may be configured to generate rendering code that will be used by a computing device to generate and display a user interface (e.g., a print dialog) that may be used to print to the remote printer. In one aspect, the rendering code may be may be in the form of, for example, JavaScript code, a JavaScript Object Notation (JSON) object, or Extensible Markup Language (XML) code. The rendering code may, in other aspects, be in the form of any other user interface description languages (e.g., HTML, CSS, etc.).

The rendering code may, according to one aspect, be stored in the storage module 220 where it can be later retrieved and transmitted by the interface module 210 to a computing device where it may be used to display a user interface. For example, when a user on a computing device (e.g., a smart phone, a tablet computer, or other mobile device) wants to print an item (document, file, image, etc.), the computing device may contact a system providing a remote printing service to request a list of remote printers that the computing device is authorized to print on (e.g., the user has previously registered).

After the user selects one of the remote printers, the remote printing service may transmit the rendering code associated with the selected remote printer to the user's computing device. The rendering code may be used by the computing device to generate a user interface that may be used by the user to select various options and send a print job to the remote printer for printing.

Figure 3:
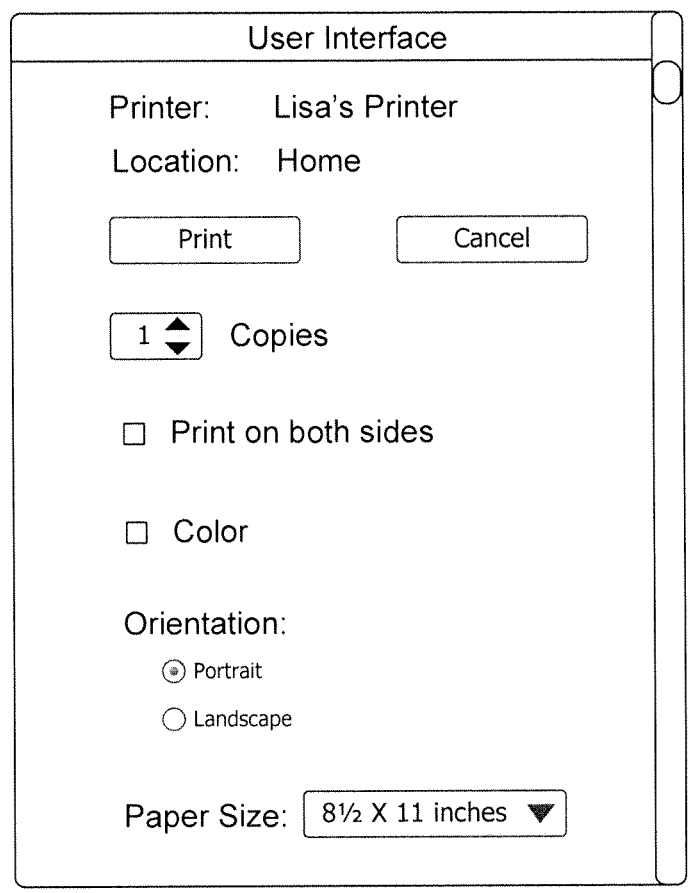
FIG. 3 is a conceptual diagram illustrating a user interface displayed on a computing device, in accordance with one aspect of the subject technology.

For example, FIG. 3 is a conceptual diagram illustrating a user interface 300 displayed on a computing device, in accordance with one aspect of the subject technology. The user interface may be a part of a print dialog and be generated using the rendering code provided by the system 200. The user interface may include a number of printer characteristics (e.g., printer name and printer location) and options (e.g., a number of copies, printing on both sides, color printing, portrait or landscape orientation, or paper size) that are available for a selected remote printer. In one aspect however, not all printer options or printer characteristics for the selected remote printer are shown in the user interface 300. Instead, only the printer options and characteristics that are also prioritized by the system 200 are displayed.

According to one aspect, the rendering code may be configured to generate a standardized user interface for multiple remote printers. Some printer user interfaces may be designed by the printer manufacturers and which may vary from one printer manufacturer to another and sometimes even vary from one printer model to another. Instead of displaying user interfaces designed by the manufacturers, a standardized user interface may be displayed for all remote printers. By displaying a standardized user interface, users may become familiar with the user interface and know where to locate desired printer options. A user familiar with the standardized user interface may locate printer options where they expect the printer options to be.

As discussed above, the logic configured to select the subset of printing options to display to the user may be located on the system. However, according to another aspect, logic on the computing device may be used to select the subset of printing options. For example, the server may convert the printer characteristics in the printer description file into another format (e.g., JavaScript code, a JSON object, or XML code) and transmit the converted printer characteristics to the computing device when a user selects the associated printer. One or more modules (e.g., an option module) on the computing device may then be configured to select a subset of the printer options and use the subset of printer objects to generate the standardized user interface to display to the user.

Figure 4:
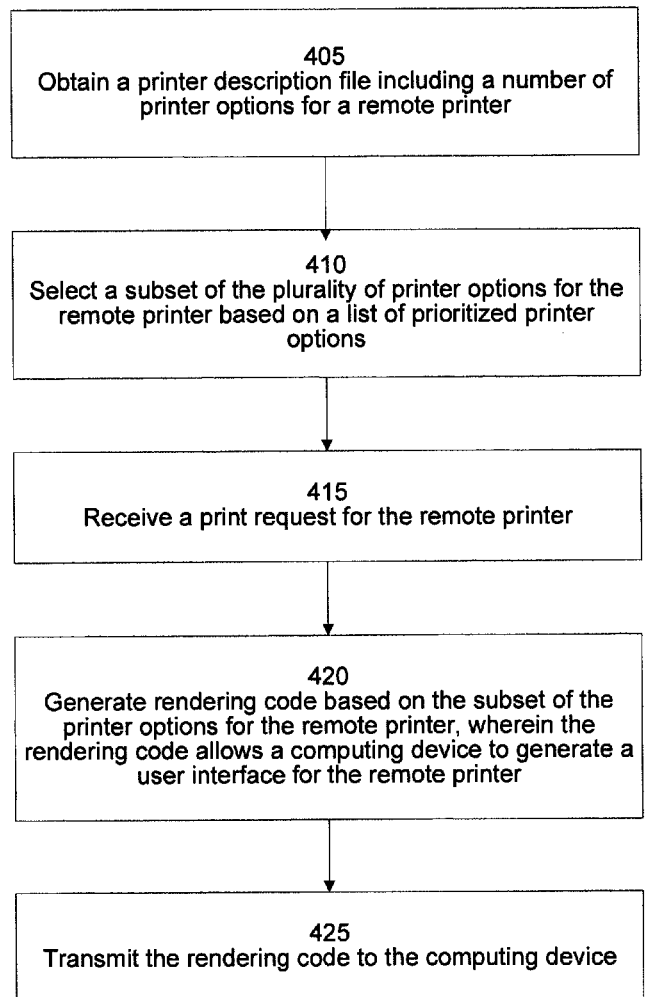
FIG. 4 is a flow chart illustrating a process for generating rendering code for a user interface from a printer description file, in accordance with one aspect of the subject technology.

FIG. 4 is a flow chart illustrating a process 400 for generating rendering code for a user interface from a printer description file, in accordance with one aspect of the subject technology. Although the operations in process 400 are shown in a particular order, certain operations may be performed in different orders or at the same time.

At operation 405, for each printer that will use the remote printing service, the interface module 210 may obtain a printer description file for the remote printer. The printer description file (e.g., a PPD file or an XPS file) may include a list of printer characteristics and printer options for the remote printer. In one aspect, the printer description file may be received by the interface module 210 during a registration process when a user registers a remote printer with the remote printing service. In other aspects, the printer description file may be obtained from a third party or a printer manufacturer and may be associated with a particular remote printer when the user registers the remote printer with the remote printing service.

The option module 230 may select a subset of the printer options for the remote printer at operation 410 using a list of prioritized options. For example, the option module 230 may identify the printer options described in the printer description file and compare the printer options with the set of prioritized printer options. These prioritized printer options may be determined before hand by the remote printing service or an administrator of the remote printing service based on various factors. For example, the prioritized printer options may be selected based on the options that users most often use. Based on the comparison, the option module 230 may select printer options that are available for the remote printer and also in the set of prioritized printer options.

At operation 415, the interface module 210 may receive a print request for the remote printer from a computing device (e.g., a laptop, a smart phone, or a tablet). For example, the computing device may contact the remote printing service and request a list of printers that a user of the computing device is able to print from (e.g., remote printers that are registered with the remote printing service that the user is authorized to print from). The user of the computing device may select one of the printers on the list and submit a print request to the interface module 210 specifying the selected remote printer 130.

In response to receiving the print request, the interface generation module 240 may generate rendering code based on the selected printer options for the remote printer at operation 420 and, at operation 425, the interface module 210 may transmit the rendering code for the remote printer to the requesting printer device.

The rendering code may be configured to enable the computing device to generate a user interface for the remote printer. The user interface may include various options and characteristics for the remote printer and may be used by the user to, for example, select options for a print job (e.g., a document to be printed), view details of the print job, and transmit the print job to the remote printer or the managing device for the remote printer for printing.

Although the aspect discussed above includes generating the rendering code in response to receiving a print request, according to another aspect, the rendering code may be generated before hand (e.g., after receiving the printer description file from the managing device 120 during printer registration) and stored in a database containing rendering code for printers registered with the remote printing service. The remote printing service may then response to print requests by identifying the rendering code that corresponds to the remote printer specified in the print request and transmitting the rendering code for the remote printer to the computing device.

Figure 5:
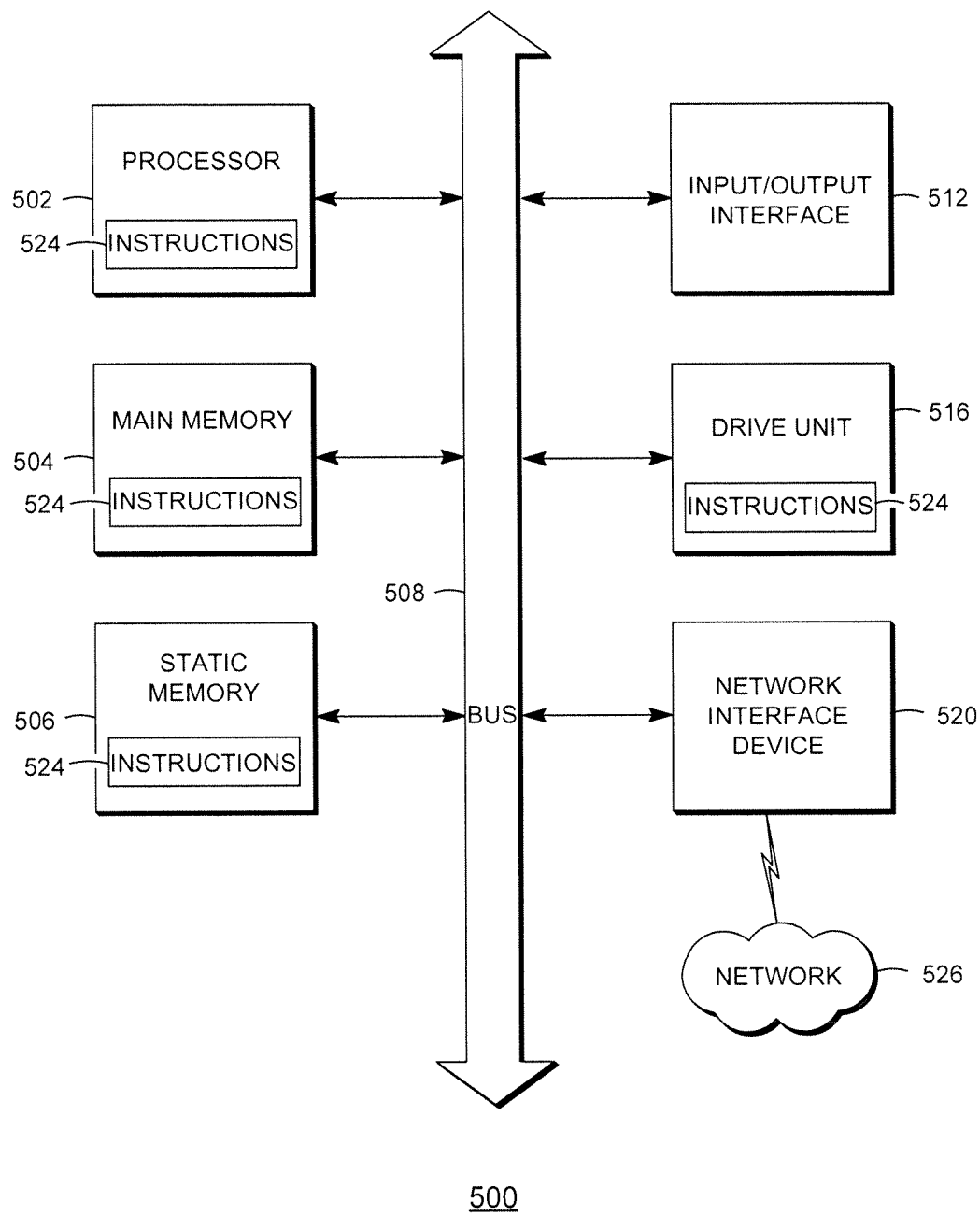
FIG. 5 is a block diagram illustrating a computer system with which any of the clients, servers, or systems discussed may be implemented, according to various aspects of the subject technology.

FIG. 5 is a block diagram illustrating a computer system with which any of the clients, servers, or systems discussed may be implemented, according to various aspects of the subject technology. In certain aspects, the computer system 500 may be implemented using hardware or a combination of software and hardware, either in a dedicated server, or integrated into another entity, or distributed across multiple entities.

The example computer system 500 includes a processor 502, a main memory 504, a static memory 506, a disk drive unit 516, and a network interface device 520 which communicate with each other via a bus 508. The computer system 500 may further include an input/output interface 512 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 502 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 524 embodying any one or more of the methodologies or functions described herein. The instructions 524 may also reside, completely or at least partially, within the main memory 504 and/or within the processor 502 during execution thereof by the computer system 500, with the main memory 504 and the processor 502 also constituting machine-readable media. The instructions 524 may further be transmitted or received over a network 526 via the network interface device 520.

The machine-readable medium may be a single medium or multiple media (e.g., a centralized or distributed database, and/or associated caches and servers) that store the one or more sets of instructions. The machine-readable medium may include the drive unit 516, the static memory 506, the main memory 504, the processor 502, an external memory connected to the input/output interface 512, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Systems, methods, and machine-readable media for generating a user interface from a printer description file are discussed herein. The system comprising an interface module, an option module, and an interface generation module. The interface module may be configured to receive a printer description file comprising a plurality of printer options for a remote printer and the option module may be configured to select a subset of the plurality of printer options for the remote printer based on a list of prioritized printer options. The interface generation module may be configured to generate rendering code based on the subset of the plurality of printer options for the remote printer, the rendering code to enable a computing device to generate a user interface for the remote printer. The rendering code may be transmitted to a computing device in response to receiving, from the computing device, a print request for the remote printer.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for generating rendering code for a user interface from a printer description file, the method comprising:
    obtaining a printer description file comprising a plurality of printer options for a remote printer;
    comparing the plurality of printer options for the remote printer to a list of prioritized printer options, wherein the list of prioritized printer options comprises a plurality of printer options most frequently used including one or more printer functions available to the remote printer and one or more printer functions incapable of being performed by the remote printer now and in the future;
    selecting, based on the comparison, a subset of the plurality of printer options from the printer description file, wherein the subset includes one or more printer options that are in the plurality of printer options for the remote printer and the list of prioritized printer options;
    receiving, from a computing device, a print request for the remote printer;
    generating, at a server, rendering code for a user interface including the subset of the plurality of printer options from the printer description file, the rendering code to enable the computing device to generate the user interface for the remote printer; and
    transmitting the rendering code from the server to the computing device.

2. The computer-implemented method of claim 1, wherein the printer description file is obtained, via a network, from a managing device connected to the remote printer.

3. The computer-implemented method of claim 1, wherein the printer description file is received during a registration process for the remote printer.

4. The computer-implemented method of claim 1, wherein the generating of the rendering code precedes the receiving of the print request.

5. The computer-implemented method of claim 1, wherein the printer description file further comprises a plurality of characteristics for the remote printer, the method further comprising:
    comparing the plurality of characteristics for the remote printer to a set of prioritized printer characteristics;
    selecting a subset of the plurality of characteristics for the remote printer based on the comparison; and
    wherein the rendering code is further generated based on the subset of the plurality of characteristics for the remote printer.

6. The computer-implemented method of claim 1, wherein the computing device and the remote printer are not directly connected.

7. The computer-implemented method of claim 1, wherein the rendering code is one of a JavaScript code, a JSON object, or extensible markup language (XML) code.

8. The computer-implemented method of claim 1, wherein the printer description file is one of a XML paper specification (XPS) file or a postscript printer description (PPD) file.

9. A system for generating rendering code for a user interface from a printer description file, the system comprising:
    one or more processors; and
    a machine-readable medium encoded with instructions executable by the one or more processors, the instructions comprising:
        an interface module configured to receive a printer description file comprising a plurality of printer options for a remote printer;
        an option module configured to:
            compare the plurality of printer options for the remote printer to a list of prioritized printer options, wherein the list of prioritized printer options comprises a plurality of printer options most frequently used including one or more printer functions available to the remote printer and one or more printer functions incapable of being performed by the remote printer now and in the future;
            select, based on the comparison, a subset of the plurality of printer options from the printer description file, wherein the subset includes one or more printer options that are in the plurality of printer options for the remote printer and the list of prioritized printer options; and an interface generation module configured to generate, at a server, rendering code for a user interface including the subset of the plurality of printer options from the printer description file, the rendering code to enable a computing device to generate the user interface for the remote printer.

10. The system of claim 9, wherein the option module is located on the computing device.

11. The system of claim 9, wherein the printer description file is received, via a network, from a managing device connected to the remote printer.

12. The system of claim 9, wherein the interface module is further configured to receive a print request from the computing device, the print request comprising a selection of the remote printer from the computing device.

13. The system of claim 12, wherein the interface generation module is configured to generate the rendering code in response to the interface module receiving the print request.

14. The system of claim 9, wherein the interface module is further configured to transmit the rendering code to the computing device.

15. The system of claim 9, wherein the printer description file is one of a XML paper specification (XPS) file or a postscript printer description (PPD) file.

16. The system of claim 9, further comprising a storage module configured to store the printer description file.

17. A non-transitory machine-readable medium comprising instructions stored therein, which when executed by a machine, cause the machine to perform operations comprising:

receiving, during a registration process for a remote printer, a printer description file comprising a plurality of printer options for the remote printer;

comparing the plurality of printer options for the remote printer to a list of prioritized printer options, wherein the list of prioritized printer options comprises a plurality of printer options most frequently used including one or more printer functions available to the remote printer and one or more printer functions incapable of being performed by the remote printer now and in the future;

selecting, based on the comparison, a subset of the plurality of printer options from the printer description file, wherein the subset includes one or more printer options that are in the plurality of printer options for the remote printer and the list of prioritized printer options; and generating, at a server, rendering code for a user interface including the subset of the plurality of printer options from the printer description file, the rendering code to enable a computing device to generate the user interface for the remote printer.

18. The non-transitory machine-readable medium of claim 17, wherein the printer description file is received from a managing device connected to the remote printer.

19. The non-transitory machine-readable medium of claim 17, the operations further comprising receiving a print request from the computing device, the print request comprising a selection of the remote printer from the computing device.

20. The non-transitory machine-readable medium of claim 17, the operations further comprising transmitting the rendering code to the computing device.

21. The non-transitory machine-readable medium of claim 17, wherein the printer description file is one of a XML paper specification (XPS) file or a postscript printer description (PPD) file.

* * * * *